May 30, 1961
C. I. CLAUSING
2,986,618
TIME DELAY TRIPPING FEATURE FOR HIGH SPEED BREAKERS
Filed April 7, 1959
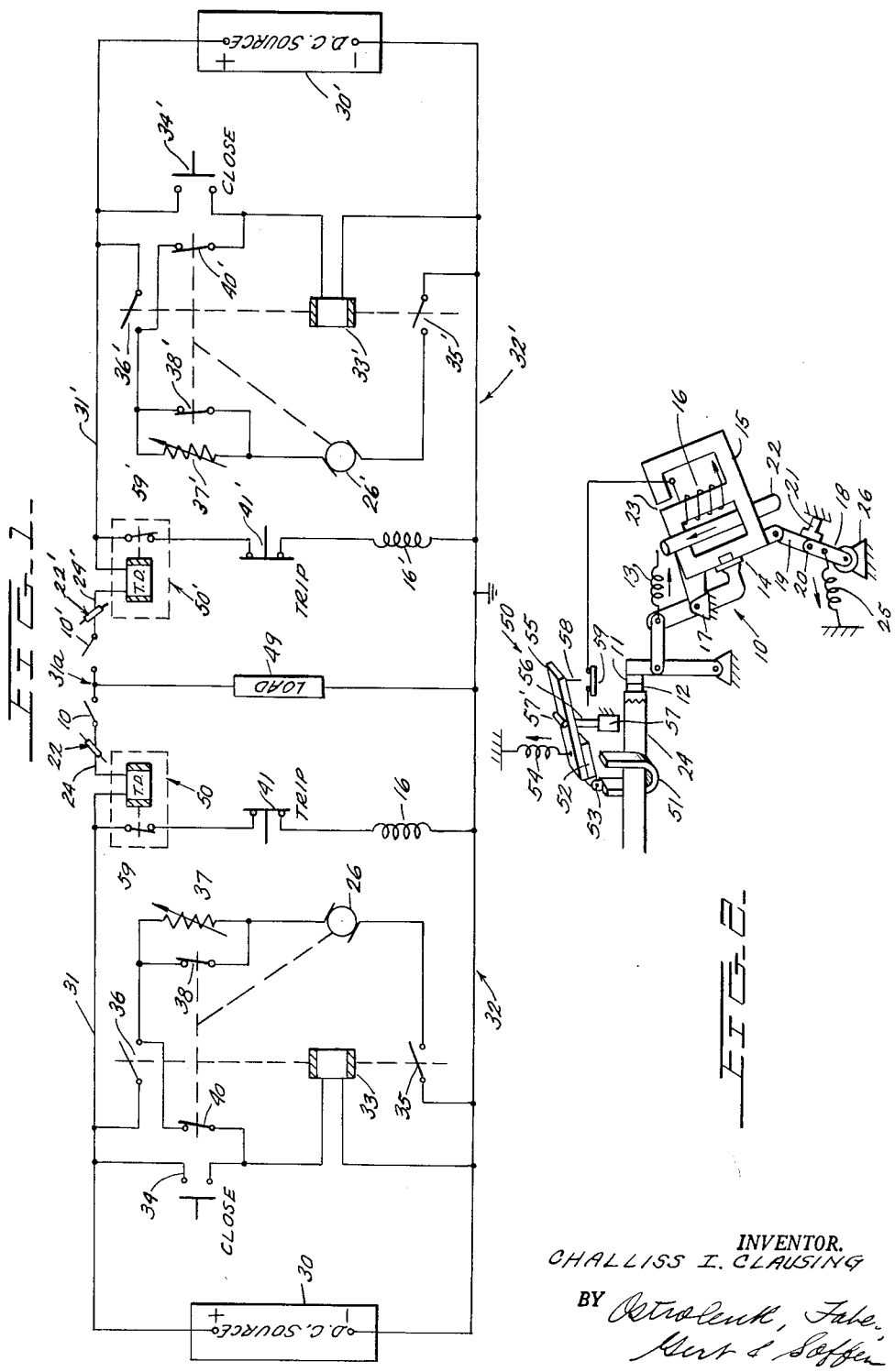
INVENTOR.
CHALLISS I. CLAUSING
BY
ATTORNEYS United States Patent Office 2,986,618
Patented May 30, 1961

2,986,618

TIME DELAY TRIPPING FEATURE FOR HIGH SPEED BREAKERS

Challiss I. Clausing, Collingswood, N.J., assignor to I-T-E Circuit Breaker Company, Philadelphia, Pa., a corporation of Pennsylvania Filed Apr. 7, 1959, Ser. No. 804,744

4 Claims. (Cl. 200—93)

The instant invention relates to high speed circuit breakers in general and more particularly to a novel arrangement whereby the tripping performance thereof is extended over a considerable range.

In my copending application Serial No. 660,970, filed May 22, 1957, now Patent No. 2,891,123, entitled "High Speed Circuit Breaker," and assigned to the assignee of the instant invention, there is disclosed a high speed D.C. circuit breaker including a magnetic latch. The magnetic latch comprises a relatively movable armature which is magnetically sealable to a relatively movable magnet. The armature carries the circuit breaker movable contact while the magnet is connected to the circuit breaker operating mechanism.

Magnetic sealing of the armature to the magnet is accomplished by means of flux generated by a polarizing coil while tripping is accomplished either by opening the polarizing coil energizing circuit or by passing sufficient current through a bucking bar which generates flux in a direction opposite to the direction of flux generated by the polarizing coil. When the magnitude of the bucking flux reaches a predetermined value the armature is no longer sealed to the magnet and the opening springs bring about a very rapid disengagement of the circuit breaker contacts.

It has been found advantageous to utilize this type of high speed breaker in circuits whose characteristics would, under certain operating conditions, permit protection with circuit breakers having longer tripping time characteristics. Thus, time delay tripping is a desirable feature to be incorporated in a high speed breaker under certain conditions, for example, motor starting applications.

By incorporating an overload unit into a high speed circuit breaker the high speed or current limiting tripping function of the breaker is left intact and a considerable range of tripping performance is added to the breaker. High speed tripping is directional and is calibrated in the instantaneous trip range with the direction of tripping current being selected to achieve the maximum amount of protection to the system by current limiting action upon the occurrence of extreme short circuit currents.

The additional trip unit may be calibrated to achieve "instantaneous" tripping which, while somewhat slower in operation than the ordinary high speed tripping function of the circuit breaker, adds a highly desirable duo-directional trip feature. That is, the additional trip unit is connected into the circuit so as to function on currents opposite in polarity to the currents which achieve the ordinary high speed tripping of the breaker. In addition, more than one additional trip unit may be added to the high speed circuit breaker with the time delay bands of the additional trip units and the high speed trip unit being arranged for selected tripping application.

The additional trip unit takes the form of a magnet energized by the main circuit current with the magnet armature being connected to a dashpot or other delay means so as to retard the movement of the armature upon the occurrence of an over current condition. When the armature is moved a predetermined distance it will actuate a switch which opens the energizing circuit for the circuit breaker polarizing coil thereby unsealing the armature of the magnetic latch and permitting the cooperating contacts to be disengaged.

Accordingly, a primary object of the instant invention is to provide novel means for extending the tripping performance range of a conventional high speed circuit breaker.

Another object is to provide a novel arrangement which includes the addition of a time delay tripping means to a high speed D.C. circuit breaker whereby duo-directional tripping characteristics are achieved.

Still another object is to provide a novel circuit breaker arrangement whereby the combination of current limiting action and selected tripping is achieved.

These as well as other objects of the instant invention shall become readily apparent after reading the following description of the accompanying figures in which:

Figure 1 is an electrical schematic diagram illustrating the relationship between the high speed trip unit of the high speed circuit breaker and the additional time delay trip unit with two circuit breakers connected between a single load and two separate energy sources.

Figure 2 is a schematic illustrating a high speed circuit breaker to which an additional trip unit has been added.

Now referring to the figures, circuit breaker 10 is of the type described in detail in my aforesaid copending application Ser. No. 660,970. In Figure 2, high speed circuit breaker 10 is in its closed position with movable contact 11 being in engagement with stationary contact 12. Spring 13 exerts a direct acting opening force upon movable contact 11 but breaker 10 is held closed by the magnetic latch comprising armature 14 secured to magnet 15 by a flux generated by polarizing coil 16.

The magnetic structure 15, which is otherwise free to pivot about point 17, is maintained in the position of Figure 2 by an over-center toggle, comprising links 18, 19, whose knee 20 bears against stop 21. The toggle condition illustrated in Figure 2 is maintained by the clockwise component of force produced by the opening spring 20 and transmitted through armature 14 which is sealed to magnet structure 15.

When circuit breaker 10 is set for high speed reverse current the trip flux produced by a forward current in bucking bar 22 aids the flux produced by polarizing coil 16 and helps to hold armature 14 against the magnet 15 with reversal of the main circuit current reversing the bucking bar flux and reducing the flux through armature 14 by shifting the flux through air gap 23 into an alternate path. The armature 14 is now free and is parted from the magnet 15 by the opening spring 13 thus removing the force of spring 13 from toggle 18, 19. After cooperating contacts 11, 12 have parted, tension spring 25 acts upon link 18 to break toggle 18, 19 thereby allowing magnetic structure 15 to pivot downward about point 17 to the fully opened position of the breaker 10. When circuit breaker 10 is set for high speed tripping on forward over current, the polarity of polarizing coil 16 is reversed so that the normal current in bucking bar 22 tends to diminish total flux through the armature path. When the current through circuit breaker 10 and bucking bar 22 rises to a predetermined value the armature flux is reduced to a value which allows breaker 10 to open in the same manner as outlined in the previous paragraph.

When circuit breaker 10 is opened toggle 18, 19 is collapsed to the left through the action of spring 25 thereby rotating magnetic structure 15 clockwise about pivot 17 to a position abutting armature 14 so that armature 14 is once again sealed to magnet 15. Closing is then accomplished by operating motor 26, which drives link 18 through a spring clutch (not shown) until the overcenter toggle condition of Figure 2 is reestablished. When knee 20 contacts stop 21 the spring clutch disengages motor 26 and the motor control circuit is opened by limit switch contacts (not shown) operated by toggle members 18, 19. During this closing operation armature 14 is sealed to magnet 15 by the polarizing flux generated by polarizing coil 16. If adverse conditions still exist in the main circuit, highspeed circuit breaker 10 is free to trip even though motor 26 is driving the magnetic structure 15 counterclockwise toward the closed position.

Stationary contact 12 is mounted to the free end of current carrying stud 24. The current carried by stud 24 acts as the energizing source for time delay tripping means 50 which includes magnet 51 surrounding stud 24. Movable armature 52, pivotally mounted at 53, is biased away from magnet 51 by spring 54. Extension 55 projecting from armature 52 carries link 56 pivotally mounted at pin 57. Link 56 is connected to time delay means 57 which comprises a mechanical device rather than a bimetal. That is, time delay means 57 comprises a dashpot oil displacement means of the type fully described in the copending application of C. J. Yarrick, Serial No. 424,416, filed April 20, 1954, entitled "Temperature Compensated Time Delay Means," and assigned to the assignee of the instant invention. Projection 58, carried by extension 55, is operatively positioned to engage and thereby open normally closed contacts 59 when armature 52 is within a predetermined distance of magnet 51, for a reason to be hereinafter explained.

Figure 1 illustrates the circuit connection between load 49 and D.C. sources 30, 30' through highspeed circuit breakers 10, 10' respectively, as well as the control circuits for the circuit breakers 10, 10'. The control circuits are substantially as those described in my copending application Serial No. 721,971, filed March 17, 1958, now Patent No. 2,881,869, entitled "Anti-Pump Control Circuit for Motor Closed Circuit Breaker," and assigned to the assignee of the instant invention. Since the control circuits of high speed circuit breakers 10, 10' are identical, only the control circuit for circuit breaker 10 will be described it being understood that primed reference numerals of like numbers refer to the same elements for circuit breaker 10'.

The control circuit for operating high speed circuit breaker 10 essentially comprising three series paths connected in parallel across lines 31, 32 which are connected to the positive and negative terminals respectively of D.C. power source 30. The first series path comprises closing relay coil 33 and normally open closing switch 34. The second series path comprises, in order beginning at line 32, a first pair of normally open contacts 35, operating motor 26, variable resistor 37, and a second pair of normally open contacts 36. A pair of normally closed contacts 38 associated with the toggle members 18, 19 is connected across resistor 37, and a pair of normally closed slow to open contacts 40, also associated with the toggle members 18, 19 is connected between the juncture of closing switch 34 and closing coil 33, and the juncture of resistor 37 and contacts 36.

The third series path comprises polarizing coil 16, the normally closed contacts of trip control 41, and the normally closed contacts 59 of the time delay tripping means 50. Bucking bar 22 and the magnet 51 of time delay tripping means 50 are both operatively positioned with respect to current carrying stud 24 so as to be responsive to the current flowing therethrough. Stud 24 is connected in series with circuit conductor 31.

While bucking bar 22 has been illustrated as being merely coupled to current stud 24, it is to be understood that for some applications bucking bar 22 is connected in electrical series with current stud 24 and time delay means 50 is coupled to bucking bar 22.

Closing of circuit breaker 10 is initiated by operating closing switch 34 which energizes coil 33 of the closing relay. This closes the pairs of contacts 35, 36 in series with motor 26. Closed contacts 36 and normally closed contacts 40 provide an energizing path which is independent of closing switch 34. Since resistor 37 is shorted by contacts 38, motor 26 is now connected directly to D.C. power source 30. Motor 26 then extends toggle 18, 19 to the straight position of Figure 2 so that magnet 15 is rotated counterclockwise about point 17 causing movable contact 11 to approach stationary contact 12. When toggle 18, 19 passes over center, knee 20 engages stop 21 and contacts 38 are opened thereby placing resistor 37 in series with motor 26. This reduces the motor voltage to approximately 10% of normal as determined by the resistance value of resistor 37. The reduced voltage applied to motor 26 tending to move knee 20 against stop 21, together with the inertia of the moving parts, prevents any rebound of toggle 18, 19.

Contacts 40 are gauged to contacts 38 but are mechanically set to open a short time thereafter. Thus, the opening of contacts 40 follows the opening of contacts 38 with the opening of the former interrupting the hold circuit for operating coil 33 unless the closing initiating switch 34 remains closed.

If high speed circuit breaker 10 closes on a fault or for any reason magnetic latch 14, 15 releases during closing, breaker 10 trips independently of toggle 18, 19. Motor 26 continues to operate toggle 18, 19 to the over center position of Figure 2. However, spring 25 cannot collapse toggle 18, 19 while closing switch 34 is closed since even the reduced voltage to motor 26 prevents backward rotation thereof. This assures but a single closing attempt per operation of switch 34.

Manual tripping of high speed circuit breaker 10 is accomplished by opening the contacts of the trip control 41 which interrupts the energizing circuit of polarizing coil 16. The energizing circuit for polarizing coil 16 may also be interrupted by the opening of normally closed contacts 59 by the time delay tripping means 50.

In the circuit of Figure 1 load 49 is connected between grounded line 32, 32' and line 31a which is connected between high speed circuit breakers 10 and 10'. Grounded lead 32 is connected to the negative terminals of both D.C. energy sources 30 and 30' while the positive terminal of D.C. source 30 is connected through conductor 31 to current stud 24 of high speed circuit breaker 10 and conductor 31' connects the positive terminal of D.C. source 30' to current stud 24' of high speed circuit breaker 10'. Load 49 comprises a device, such as a large motor, whose starting current is quite high in magnitude compared to the operating current thereof.

Bucking bar 22 is operatively connected so that the flux generated thereby will aid the flux generated by polarizing coil 16 when current is being fed from source 30 to load 49. Similarly, bucking bar 22' is operatively connected so that the flux generated thereby will aid the flux generated by polarizing coil 16' when current flows from D.C. source 30' to load 49. However, if the output of either source drops sufficiently to permit the other source to supply energy thereto there will be a current reversal through one of the high speed circuit breakers 10, 10'.

When reverse current flows through the circuit breaker 10 or 10' the bucking coil 22, 22', respectively, thereof is energized by a current of reverse polarity thereby generating a flux which bucks the flux of its associated polarizing coil 16 or 16' to bring about the high speed tripping of circuit breaker 10 or 10' through which the reverse current is flowing.

The high magnitude of starting current for load 49 will cause bucking bars 22, 22' to generate fluxes which aid the fluxes generated by the respective polarizing coils 16, 16' so that high speed tripping of circuit breakers 10, 10' will not be caused thereby. If the magnitudes of starting currents remain for too long an interval of time, the projection 58 of the time delay tripping means 50 will open contacts 59 thereby interrupting the energizing circuit for polarizing coils 16 and thereby cause circuit breaker 10 to trip. Thus, currents in one direction will cause time delay tripping of the circuit breaker while currents of reverse direction will cause high speed tripping of the circuit breaker.

The D.C. sources 30, 30′ comprise rotating generators. When there is a current reversal through one of the high speed circuit breakers 10, 10′ this indicates that the generators of sources 30, 30′ are not functioning. Under these circumstances an essentially short circuit condition is presented to the circuit breakers 10, 10′ rising at a very rapid rate. Since the magnetic latch 14, 15 is so fast acting one of circuit breakers 10 or 10′ through which reverse current is flowing will interrupt the circuit in a short time interval with current limiting action. This interval of time is considerably shorter than the delay introduced by dashpot 57 so that the time delay trip means 50 of the circuit breaker 10 or 10′ carrying forward current will not cause tripping thereof.

Armature 52 is attracted to magnet 51 by an overload current, that is, a current of lower magnitude than short circuit currents. However, the time delay trip means 50 is much slower acting in tripping magnetic latch 14, 15 than is the effect of the flux generated by bucking bar 22.

Although I have here described preferred embodiment of my novel invention, many variations and modifications will now be apparent to those skilled in the art, and I therefore prefer to be limited, not by the specific disclosure herein, but only by the appended claims.

I claim:
1. A high speed circuit breaker including a pair of cooperating contacts, means biasing said contacts toward a disengaged position, second means for operating said contacts to an engaged position against the force of said first means, latch means for maintaining said contacts in said engaged position; first means actuable by a first condition, present in a circuit protected by said circuit breaker, to unlatch said latch means; second means actuable by a second condition, present in a circuit protected by said circuit breaker, to unlatch said latch means; said first condition comprising short circuit currents and said second condition comprising overload currents present for a predetermined interval of time; said latch means comprising electro-magnetic means including a magnet, an armature, polarizing means, an energizing circuit for said polarizing means whereby said polarizing means generates a first flux in said magnet of sufficient magnitude to seal said armature to said magnet; said first means including means for generating a second flux in said magnet, responsive to said first condition, which bucks said first flux; said second flux when of a predetermined magnitude causing said armature to be released from said magnet; said second means, when actuated, interrupting said polarizing means energizing circuit thereby releasing said armature from said magnet.

2. A high speed circuit breaker including a pair of cooperating contacts, means biasing said contacts toward a disengaged position, second means for operating said contacts to an engaged position against the force of said first means, latch means for maintaining said contacts in said engaged position; first means actuable by a first condition, present in a circuit protected by said circuit breaker, to unlatch said latch means; second means actuable by a second condition, present in a circuit protected by said circuit breaker, to unlatch said latch means; said first condition comprising short circuit currents and said second condition comprising overload currents present for a predetermined interval of time; said latch means comprising electro-magnetic means including a magnet, an armature, polarizing means, an energizing circuit for said polarizing means whereby said polarizing means generates a first flux in said magnet of sufficient magnitude to seal said armature to said magnet; said first means including means for generating a second flux in said magnet, responsive to said first condition, which bucks said first flux; said second flux when of a predetermined magnitude causing said armature to be released from said magnet; said second means, when actuated, interrupting said polarizing means energizing circuit thereby releasing said armature from said magnet; said second means including a mechanical time delay device.

3. A high speed circuit breaker including a pair of cooperating contacts, means biasing said contacts toward a disengaged position, second means for operating said contacts to an engaged position against the force of said first means, latch means for maintaining said contacts in said engaged position; first means actuable by a first condition, present in a circuit protected by said circuit breaker, to unlatch said latch means; second means actuable by a second condition, present in a circuit protected by said circuit breaker, to unlatch said latch means; said first condition comprising short circuit currents and said second condition comprising overload currents present for a predetermined interval of time; said latch means comprising electro-magnetic means including a magnet, an armature, polarizing means, an energizing circuit for said polarizing means whereby said polarizing means generates a first flux in said magnet of sufficient magnitude to seal said armature to said magnet; said first means including means for generating a second flux in said magnet, responsive to said first condition, which bucks said first flux; said second flux when of a predetermined magnitude causing said armature to be released from said magnet; said second means, when actuated, interrupting said polarizing means energizing circuit thereby releasing said armature from said magnet; said overload currents and said short circuit currents being D.C. currents of opposite polarities.

4. A high speed D.-C. circuit breaker; said high speed circuit breaker including a pair of cooperating contacts; biasing means connected to at least one of said pair of cooperating contacts for biasing said cooperating contacts toward a relatively disengaged position with respect to one another; an operating means; said operating means being connected to at least one of said pair of cooperating contacts for operating said cooperating contacts to an engaged position with respect to one another against the force of said biasing means; a latch means; said latch means being operatively connectable to at least one of said pair of cooperating contacts for maintaining said cooperating contacts in their said engaged position when moved thereto; a first trip means and a second trip means; said first trip means and said second trip means being operatively connectable to said latch means and being operable to unlatch said latch means responsive to their operation; said first and second trip means being energizable responsive to predetermined circuit conditions in the circuit being protected by said high speed D.-C. circuit breaker; said first trip means being operable to unlatch said latch means responsive to a rapid rate of change of current normally conducted through said pair of cooperating contacts in a first direction; said second trip means including time delay means and being operable responsive to predetermined overload currents in a direction opposite said first direction and after a predetermined length of time.

References Cited in the file of this patent
UNITED STATES PATENTS
2,601,482    Wood _____ June 24, 1952
FOREIGN PATENTS
708,012    Germany _____ July 10, 1941